UNITED STATES PATENT OFFICE.

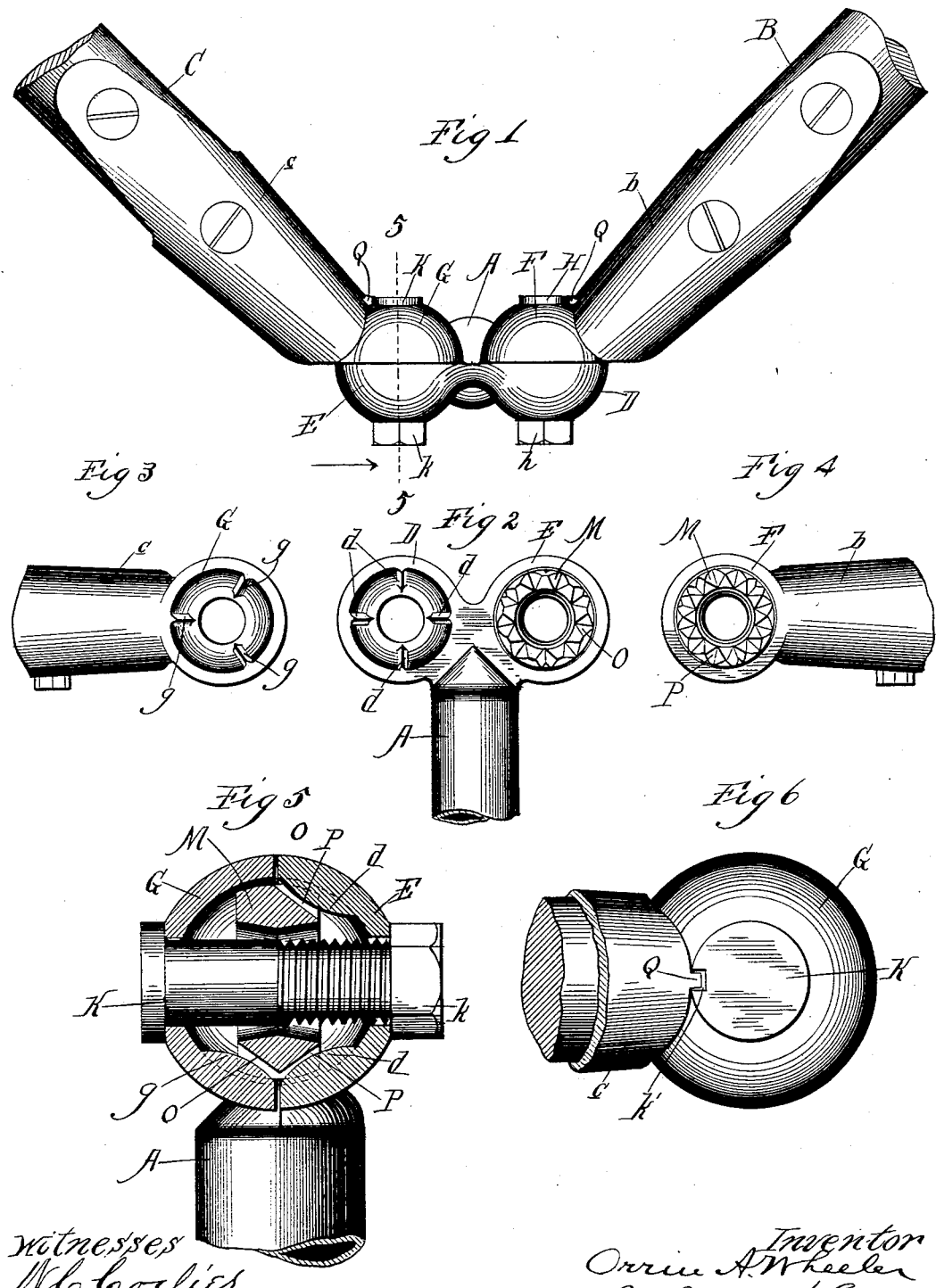

ORRIN A. WHEELER, OF CHICAGO, ILLINOIS.

BICYCLE HANDLE-BAR.

SPECIFICATION forming part of Letters Patent No. 593,367, dated November 9, 1897.

Application filed December 21, 1896. Serial No. 616,402. (No model.)

*To all whom it may concern:*

Be it known that I, ORRIN A. WHEELER, a citizen of the United States, residing at Chicago, in the county of Cook and State of Illinois, have invented certain new and useful Improvements in Bicycle Handle-Bars; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to that class of adjustable handle-bars in which the movement is in a plane transverse to the length of the bicycle; and its object is to provide for fine degrees of adjustment in connection with a joint which provides for the positive locking of the handle-bar against angular movement.

The invention consists in a hollow spherical joint divided equatorially, one portion being fixed to the stem of the bicycle-frame and the other to the handle-bar, each section being internally ribbed to coöperate with a locking-block inclosed within the sphere and having upon its opposite faces two series of serrations differing in the number of their teeth, the two members of the spherical body of the joint being secured together by a bolt.

In the drawings, Figure 1 is a plan view of the head of a bicycle provided with my improved adjusting-joint. Fig. 2 is a front elevation of the bicycle-stem with the handle-bars removed, the stem-section of one of the joints being shown with the locking-block in place and the other with the locking-block removed. Fig. 3 is an elevation of the face of the section of the joint which is secured to the handle-bar, the locking-block being removed. Fig. 4 is a similar view with the locking-block in position. Fig. 5 is a sectional view on the line 5 5 of Fig. 1; and Fig. 6 is a detail front elevation of the joint, Figs. 5 and 6 being upon an enlarged scale.

The main stem of the bicycle is shown at A, and the inner ends of a pair of handle-bars of the ram's-horn type at B C.

The drawings represent the handle-bars as being of wood and as being provided each with a shank $b\ c$, though the invention is equally applicable to metal handle-bars.

The handle-bars are connected with the stem A by means of spherical hollow joints equatorially divided upon a vertical plane transverse to the length of the bicycle, one section D E of each joint being fixed upon the stem A and one section F G thereof being fixed to the shanks $b\ c$ of the handle-bars. The sections D E of the joints are arranged side by side and project laterally from the top of the stem A. Their convex surfaces are directed backwardly toward the rider. The two sections of the joints are secured together by bolts H K, passing diametrically through the spheres from front to rear, having reference to the relation of the joints to the bicycle, and carrying at their rearward ends nuts $h\ k$, by which the two sections of the joints are securely bound together.

The inner surfaces of the sections F G of the joints are provided each with an odd number (as shown three) of ridges $g$, meridianally arranged and equidistant apart. The sections D E are similarly provided with ribs $d$, but of an even number, four being shown. A locking-block M, circular in form and centrally apertured, fits within the chamber of each of the spheres, the bolt, as K, passing through it. This block is provided with two series of serrations O P, located upon opposite sides of its diametrical plane, which is transverse to the bolt K. The series of serrations O upon that face of the block which enters the section of the joint secured to the handle-bar has an odd number (as shown nine) of teeth, and the series P, which enters the section of the joint which is secured to the stem A, has an even number (as shown twelve) of teeth. Two of the notches, as O P, one of each series, are arranged in alinement and all of the remainder of the notches are necessarily out of alinement, and in the case of no two pair of notches to the same degree. In adjusting the handle-bars the movement may be limited to one face of the locking-block or the block may be moved relatively as to both sections of the joint. In the former case the angular movement of the handle-bar is necessarily as great as the angle between radii passing through two adjacent notches in one of the series of serrations; but in the latter case, the block M being moved relatively to one section of the joint in one direction and to the other section of the joint in the other direction, the angular movement of the handle-bar may be much less than in the former case. When the nuts $h\ k$ are tightly turned up, the ribs $d\ g$ enter the notches of the serrations and form a positive lock against angular movement of the handle-bars.

In order to lock the bolts H K against rotation, their heads are notched, as indicated at $k'$, and the shanks $b\ c$ are provided with lugs Q, adapted to enter these notches.

In order to secure adjustments approximating the fineness of the adjustments possible with the construction herein described by making the teeth of the block and the cooperating ribs of less size, it would be necessary to make them so small that they would not endure the strain to which they are necessarily subjected. By the differentiation of the number of serrations and cooperating ribs upon one side of the joint and the number upon the other side it is possible to make the adjustment as fine as may be desired.

While I have shown handle-bars of the ram's-horn type, it is obvious that the invention is equally applicable to handle-bars of any other style in which the two arms move independently.

I claim as my invention—

1. In a joint for adjustable bicycle handle-bars the combination with a plate fixed to the bicycle-stem and having a contact-face, a plate fixed to the handle-bar and having a contact-face, a block adapted to be interposed between the contact-faces of the plates, and a screw-bolt for locking said three members together, and to serve as a pivot when its tension is released, of radially-arranged ribs upon the contact-faces of the plates the two sets thereof differing in number, and notches upon the contacting faces of the block, such two sets of notches differing in number.

2. In a spherical joint for adjustable handle-bars, the combination with two semispherical parts having their meeting faces concaved and provided with meridianally-disposed ribs, of a locking-block adapted to fit within the sphere and having two sets of radially-arranged notches differing in number for cooperating with the ribs and a bolt for locking the members of the joint together.

3. In a spherical joint for adjustable handle-bars, the combination with two semispherical parts having their meeting faces concaved and provided with meridianally-disposed ribs, the number of ribs in one part being odd and in the other part even, of a locking-block adapted to enter the sphere and having two radially-arranged sets of notches for cooperating with the ribs, the number of notches in one set being one less than that in the other set, and a bolt for binding the several members of the joint together.

4. In adjustable handle-bars for bicycles comprising a pair of bars each having an independent jointed connection with the bicycle steering-stem, the combination with a steering-stem, a pair of semispherical concave attaching-lugs fixed to the steering-stem and having radially-disposed ribs on their concave faces, and a semispherical concave attaching-plate at the inner end of each handle-bar and having radially-disposed ribs on its concave face, the number of ribs on cooperating lugs and plates differing by an odd number, of a block adapted to fit within the concave faces of each pair of cooperating lugs and plates, and having on opposite faces notches for receiving the ribs, the number of notches on one face being even and upon the other face being odd, and a screw-bolt for binding together each set of cooperating lugs, plates and blocks, substantially as described and for the purpose specified.

In testimony whereof I affix my signature in presence of two witnesses.

ORRIN A. WHEELER.

Witnesses:
LOUIS K. GILLSON,
SAKE D. THOMPSON.